United States Patent Office 3,239,586
Patented Mar. 8, 1966

3,239,586
PROCESS OF MOLDING POLYESTER
TEXTILE FABRICS
Dustin S. Adams, Wilmington, Del., assignor to E. I. du Pont de Nemours and Company, Wilmington, Del., a corporation of Delaware
No Drawing. Filed Aug. 8, 1962, Ser. No. 215,532
10 Claims. (Cl. 264—123)

This invention relates to a process for the molding of fabrics. More particularly, this invention relates to the process of molding flat fabrics woven or prepared from polyester yarns in order to form three-dimensional articles such as brassieres, foundation garments, girdles and the like.

A satisfactory method has long been sought for molding fabrics to give equivalent or better products than those made by conventional cutting, shaping and sewing of three-dimensional wearing apparel. These attempts at molding have not been completely satisfactory. It has been proposed to use fabrics of fibers which are thermoplastic by themselves or which are thermoplastic in the presence of plasticizer or softening agents and to mold such fabrics by heat. Such shaped articles often exhibit a change in the fabric character resulting from the pressing together or even fusing of the plasticized yarn. Such articles have also presented stiff, board-like hand and other poor physical properties. Such shaped articles frequently tend to lose their shape in use and especially in laundering.

It has also been proposed to mold fabrics made of undrawn or partially drawn filaments such as nylon by a molding process involving cold drawing. In this process fiber distortion occurs at the apex of the molded form, the weave opens up and the original appearance of the fabric is altered so that loose fabrics as laces and tulles are required. Also, such molded fabrics contain a residual shrinkage which makes fabrication to a given laundry stable size both troublesome and expensive. Such products have poor form stability to laundering especially in the deeper molded shapes such as larger size brassieres. Resins can be added to aid the form retention of the molded product but this alters the aesthetics of the fabric and makes it into a more plastic, board-like product.

It is an object of this invention to provide a process for the molding of polyester fabrics so as to retain the fibrous identity of the starting fabrics without distortion, to retain the toughness of the starting materials and having an improved form stability in the molded state.

Other objects will be apparent as the description of the invention appears.

The objects of this invention have been met by a process for molding a fabric containing oriented and relatively low crystalline fibers of a polyester comprising the steps:

I. Immersing in a
  A. Swelling agent such as 1,1,2-trichloroethane,
  B. Under very low tension,
  C. To permit a linear shrinkage of from 10 to 44% or more of the fabric,
II. Molding the shrunken fabric by conforming it to the shape of a mold, and
III. Heat setting the fabric in the mold.

PREPARATION OF FABRIC

The polyester fiber constituent of the fabrics to be molded should be substantially oriented in order that they will have sufficient shrinkage to be operable in the process and have the strength and initial modulus desired for good products. Thus, generally tenacities of 3 to 5 grams per denier or more, elongation of 5 to 60% and initial modulus of 50 to 130 are preferably used.

In addition to being oriented the fibers should have a relatively low amount of crystallinity as measured by X-ray diffraction techniques. This is most easily judged by a relatively high shrinkage in boiling water of, for example, from 9 to 25% or more on the fibers themselves. For normal textile use, fibers are subjected to length stabilization treatments such as heat setting (e.g., at temperatures of 120–140° C.) after drawing, under tension or under partial relaxation conditions so that the shrinkage is reduced down to 8% or lower. The polyester fibers for use in this invention should not be subjected to heat treatments of greater than about 80° C. for any appreciable length of time in order to retain their low crystallinity or amorphous nature.

Similarly, in the production of a fabric from the polyester fibers, extensive heat treatments should not be used. During such steps as drying, following slashing of the warp, mild temperatures should be used so that the temperature of the yarn will not be much more than about 65° C. The usual scouring at 90–100° C. should not be permitted as these tend to cause the fibers to crystallize and reduce their shrinkage.

By the expression "fabrics" is meant not only conventional fabrics made by weaving but also knitted fabrics and laces, as well as various non-woven sheet-like structures such as felts, thin needled batts and the like. The polyester fibers may be in continuous filament form (twisted, plain, bulked, looped, curled or crimped), in short staple form or in the form of spun yarns of staple fibers.

Although this invention is based on the unique molding ability of the specially shrunken polyester fibers it will be obvious to one skilled in the art that various amounts of other fibers can be mixed with the polyester (preferably in the form of spun staple yarns) for various aesthetic and novelty purposes. Other fibers in amounts of as much as 50% can be tolerated. Preferably no more than about 35% of these other fibers such as rayon, cotton, wool, acrylics, etc., are used. For some purposes it will be desirable to treat the added non-polyester fiber in order that it will retain the fabric structure of the polyester portion of the fabric, for example, a mercerization process can be carried on a cotton component following the shrinkage with the swelling agent of the polyester component.

It will be obvious to one skilled in the art that the type of molding will be dependent to some extent on the fabric construction. This invention offers molding with all types of fabrics that heretofore has not been possible. For example, a taffeta woven from 100% polyester fiber can be used to mold a perfect hemisphere without wrinkles. Under the same condition using a tricot knitted from the same yarn, 120° of a sphere (i.e., to 30° below the equator) can be molded without forming wrinkles.

Suitable polyesters are described, e.g., in U.S. Patents 2,465,319, 2,658,055, and 2,676,945.

In a preferred embodiment of the invention, the polyester polymer is a synthetic linear condensation polyester of bifunctional ester-forming compounds wherein at least about 75% of the repeating structural units of the polymer chain include at least one divalent carbocyclic ring containing at least six carbon atoms present as an integral part of the polymer chain and having a minimum of four carbon atoms between the points of attachment of the ring in the polymer chain (para-relationship in the case of a single 6-membered ring). The polyesters may be derived from any suitable combination of bifunctional ester-forming compounds. Such compounds include hydroxy acids such as 4-(2-hydroxyethyl)benzoic acid and 4-(2-hydroxyethoxy)benzoic acid, or mixtures of the various suitable bifunctional acids or derivatives thereof and the various suitable dihydroxy compounds and derivatives thereof. The repeating structural units of the polymer chain comprise recurring divalent ester radicals as in-chain linking units which are separated by predominantly carbon atom chains or rings comprising hydrocarbon radicals, halogen-substituted hydrocarbon radicals, and chalcogen-containing hydrocarbon radicals wherein each chalcogen atom is bonded to carbon or a different chalcogen atom, and no carbon is bonded to more than one chalcogen atom. Thus, the repeating units may contain ether, sulfonyl, sulfide, or carbonyl radicals. Sulfonate salt substituents may also be present in minor amount, up to about 5 mol percent total sulfonate salt substituents in the polyester based on the number of ester linkages present in the polyester. See, for example, U.S. 3,018,272. Other suitable substituents may also be present.

Among the various suitable dicarboxylic acids are terephthalic acid, bromoterephthalic acid, hexahydroterephthalic acid, 4,4'-sulfonyldibenzoic acid, 4,4'-diphenic acid, 4,4'benzophenonedicarboxylic acid, 1,2-bis(4-carboxyphenyl)ethane, 1,2 - bis(p - carboxyphenoxy)ethane bis-4-carboxyphenyl ether and various of the naphthalenedicarboxylic acids, especially the 1,4-, 1,5-, 2,6-, and 2,7-isomers. Isophthalic acid is also suitable, especially when used in combination with a 1,4-dihydroxyaromatic compound. Carbonic acid is similarly suitable.

Among the various suitable dihydroxy compounds are the glycols, such as ethylene glycol and other glycols taken from the series $HO(CH_2)_nOH$, where $n$ is 2 to 10; cis- or trans-p-hexahydroxylylene glycol; diethylene glycol; quinitol; neopentylene glycol; 1,4-bis(hydroxyethyl)benzene; and 1,4-bis(hydroxyethoxy)benzene. Other suitable compounds include dihydroxyaromatic compounds such as 2,2-bis(4-hydroxy-3,5-dichlorophenyl)propane, hydroquinone, and 2,5- or 2,6-dihydroxynaphthalene.

SHRINKAGE OF THE FABRIC 1,1,2-trichloroethane is the preferred swelling agent for use in this invention. Methylene chloride can be used as a swelling agent at temperatures such as room temperature for times of from 5 to 10 seconds for complete shrinkage but it frequently has a disadvantage that it tends to leave a white deposit on the fabric which can be washed off with warm water before molding and heat setting but which is insolubilized after heat setting and causes a white stain. Other swelling agents such as 80% aqueous trifluoroacetic acid, at 20° C., tetrahydrofuran at the boiling point, aniline at 40°, dimethylformamide at 60°, tetrafluoropropanol at 60°, and a concentrated aqueous solution of sodium benzoate at 35° C. can be used. These latter named agents have obvious disadvantages such as health hazards and inconvenience in the process so that they are of a less desirable utility in this invention than trichloroethane.

The shrinkage of a fabric by a swelling agent produces a uniformly shrunk fabric with no wrinkles, or distortions. It is considered that this is due to the swelling of the fibers by the swelling agent which makes the fibers (and fabric) elastic in the range between original and shrunken length. This elasticity can relieve the shrinkage strains and give a uniform product. When a fabric is shrunk by heat or hot water the shrinkage is highly non-uniform and the fabric can not heal itself.

The crystallinity of the polyester and the tension on the polyester during treatment with the swelling agent must both be sufficiently low to allow it to shrink.

The means of conducting the shrinkage step in a swelling agent is not crtical. Preferably, the fabric is completely shrunk to the maximum extent possible which requires the use of a minimum of tension in handling the fabric. It is possible to only partially shrink the fabric if deep molding is not required. Certain novelty effects can be obtained by restraining the fabric shrinkage in one direction while permitting full shrinkage in the other direction. The time of treatment will be related to the efficiency of the swelling agent, the fibers themselves and the temperature of the swelling agent. The preferred agent, trichloroethane, can be used from 40° C. to its boiling point (113° C.) for times of from 0.01 to 10 seconds. Prolonged exposure to the swelling agent at elevated temperatures should be avoided in order to prevent undue crystallization which will make molding of the shrunken fabric more difficult. The shrinking is conveniently done as a batch process although it could be handled as a continuous process with proper adjustment of the speed of a continuous length of cloth through a bath.

DRYING OF SHRUNKEN FABRIC

The shrunken fabric can be drained of excess swelling agent and then molded immediately. Molding the fabric wet with the swelling agent requires less molding pressure than when the fabric is dry, but has the problem of the disposal or recovery of the swelling agent following the molding. Preferably, the fabrics are dried of the swelling agent at low temperatures below about 65° C. and preferably at room temperature and the dried and shrunken fabric then molded. The dried, shrunken fabrics retain their potential moldability for an indefinite length of time and such fabrics that have been stored at room temperature for as long as 5 days have been satisfactorily molded.

MOLDING

The molding or shaping operation can be carried out by any convenient manner such as using plug and ring molding or by matching male and female forms. This molding is conveniently carried out at room temperature as heat is not required in the molding process itself. However, since the mold may be heated by the setting step, it is possible to use a warm mold in order to save the cost and time of cooling the mold between molding cycles. The exact temperature of the mold that can be tolerated will depend upon the length of time the fabric is heated before molding and the degree of elongation or compression needed in the molding. Preferably the mold should be no hotter than about 100° C.

It is also possible to make molded fabrics by tightly fitting the original unshrunk fabric in position over a mold as, for example, by tenter hooks and then shrinking it in place by applying the swelling agent, drying and setting. This is a less preferred method inasmuch as all wrinkles, pleats, etc., must be carefully removed prior to shrinkage.

HEAT SETTING

The molded article must be heat set to reduce its shrinkage and make it dimensionally stable to wear and laundering. Since the molded fabric has some elastic recovery which would tend to cause some deviation from the mold shape, the fabric should be heat set while restrained by the mold. The heat setting is conveniently done by heating with hot air, steam, or the like. Alternatively, dielectric heating can be done when using metal male and female type of mold which permits of quick heating of the fabric without a slow cooling of the mold in preparation for the next cycle.

The setting operation is quite similar to that used to obtain dimensional stability on conventional fibers or fabrics as taught, for example, in British Patents 610,183 and 610,814. In general, the temperature used should be at least 5° C. and preferably 30° C. above the temperature to which the molded fabric will subsequently be exposed. The maximum temperature should be no greater than 20° below the melting point of the fiber. The time and temperature of the setting step are interrelated, e.g., 1 minute in water at 100° C. is equivalent to 5 seconds in 150° C. air for heat setting oriented poly(ethylene terephthalate).

Example 1

An oriented crystalline yarn is made by extruding a melt of poly(ethylene terephthalate) through a spinneret, advancing the as-spun yarn by feed rolls at 673 yards per minute (y.p.m.) under a draw pin immersed in 90° water and then over and around (14 wraps) 2 draw rolls operating at 2750 y.p.m. maintained at 20–50° C. and then to a windup device. The process is essentially that shown in Dusenbury U.S. Patent No. 3,045,315 with the use of cold drawing rolls. The 70 denier, 34 filament yarn has a shrinkage in boiling water of about 25%, a tenacity of 4.1 grams per denier and an initial modulus of 103 grams per denier. The yarn shrinks 27% and 38.9% in trichloroethane at 90° C. and at 113° C., respectively.

Example 2

A yarn containing 34 filaments of poly(ethylene terephthalate) in the as-spun condition with no drawing or heat treatment is removed from a spinning package by feed rolls moving at 100 yards per minute, passed over the surface of a finish applicator roll which applies ethanol to the yarn, then forwarded over two ceramic snub pins (making a total wrap angle of 285°) by a draw roll operating at 349 yards per minute. The yarn is thus drawn a total of 3.54 times its original undrawn length.

The physical properties of the as-drawn yarn are: tenacity 5.1 grams per denier, elongation 39%, initial modulus 75 and 2.4 denier per filament. The yarn has a boil-off shrinkage of 9.4% and shrinks 15.3, 16.8 and 28.8%, when immersed in 1,1,2-trichloroethane at 40°, 80° and 113° C., respectively. This drawing process affords a strong, oriented fiber which is amorphous (i.e., non-crystalline).

Example 3

The continuous filament yarn produced in Example 1 is used to weave a taffeta fabric with a loomed construction of 114 x 78 yarns per inch for warp and fill, respectively. The slash-drying step is carried out under 65° C. The fabric is not scoured. It has a shrinkage of 14.7 x 8.8% (wrap and fill directions) in boiling water.

A piece of the above fabric, cut to the desired shape, is weighted at one end with stainless steel weights and submerged quickly in a bath of 1,1,2-trichloroethane maintained at 90° C. The fabric shrinks to a construction of 148 x 98 (i.e., a shrinkage of 20.7% in the warp and 22.7% in the fill directions) within 1 second or less. The fabric is then removed immediately from the bath to prevent crystallization of the fiber, allowed to drain over the tank a few moments, and then placed in a laboratory hood for drying at room temperature. The dry, shrunk fabric is then molded in a room temperature mold and heat set by heating the mold.

A plug and ring molding method is used. The plug consists of two rounded projections corresponding to a 34B cup size brassiere formed of zinc metal. The ring is a flat sheet of aluminum with two holes matching the size and contours of the base radius of the cups of the plug. Tenter pins are located on the ring part of the mold just beyond the borders of the finished brassiere shape. In molding by this process, the shunken fabric is pressed down onto the tenter pins so that the fabric is smooth and flat at all points. The ring carrying the fabric is then placed over the plug or male member using guide pins on the plug, the two mold parts pressed together and locked in closed position. To heat set the fabric the entire mold with fabric included is placed in an air draft oven at 200° C. When the metal parts of the mold reach 200° C. the mold is removed from the oven, cooled with cold water down to 80° C., the mold opened and the product removed.

The molded fabrics are smooth, free of wrinkles, and have the appearance and handle of a fine fabric. Examination of the fabric shows a molded construction at the apex of the cups of 116 x 88 as compared with a construction of 148 x 94 in the bandeau (flat portion). The apex is smooth and free of holes. The molded fabrics retain their shape through repeated launderings with 60° C. water and show less than 1% shrinkage.

The properties of the individual fibers in the molded fabric will depend upon their extension in the process. The following table compares the properties of (a) the as-drawn fiber, (b) the fiber after shrinking 20% in trichloroethane followed by heat setting of the shrunken fiber, and (c) the fiber after a 20% shrinkage in trichloroethane followed by elongation to its as-drawn (unshrunk) length and heat setting in the taut condition.

| Item | Tenacity, grams/denier | Elongation, percent | Initial Modulus |
|---|---|---|---|
| (a) As-drawn | 4.1 | 26 | 103 |
| (b) Shrunk and heat set | 2.4 | 37 | 57 |
| (c) Shrunk-extended-heat set | 4.6 | 21 | 84 |

Item (b) above represents the worst possible fiber derived from this process.

Equivalent results to above are obtained when the fabric is molded wet with the swelling agent after a mere draining of excess swelling agent. Other than the convenience of working with the dried fabric the chief difference between the two molding means is that the pressure required in the dry molding is somewhat higher.

In another modification of the above processes, a tricot fabric is knit from the same yarn and a piece of this fabric is placed in contact with the taffeta so that in the final product it forms a soft inner layer on the brassiere.

Similar results to the above are obtained when the polymer in Example 1(b) is replaced with any of the following copolymers (ratio of monomer units expressed in mol percent):

Poly(ethylene terephthalate/isophthalate) (90/10 mol ratio),
Poly(ethylene terephthalate/hexahydroterephthalate) (90/10 and 80/20),
Poly[ethylene terephthalate/5 - (sodium sulfo)isophthalate] (98/2 and 96.5/3.5),
Poly(ethylene 2,6-naphthalene dicarboxylate),
Poly[ethylene 2,6-naphthalene dicarboxylate/5 - (sodium sulfo)isophthalate] (97/3).

Example 4

The oriented but amorphous filament yarn of Example 2 is crimped by passing between gear rolls at 60° C. A portion of the crimped yarn is then cut to staple length. Another portion of the crimped yarn is shrunk in 1,1,2-trichloroethane at 90° C., dried at room temperature and then cut to staple length. Equal amounts of the two staples (regular and pre-shrunk) are blended and yarns spun. From the spun yarn a twill fabric containing 106 ends by 60 picks per inch is prepared. All fabric treatments are restricted to temperatures of 65° C. or less. This fabric is shrunk in 1,1,2-trichloroethane at 90° C. as in Example 3 to about 17% and 16% in the warp and fill directions, respectively and then dried. The dried but shrunk fabric is molded as in that example, and heat set by heating to 200° C. The product is a very form-stable brassiere shape which after scrubbing in 60° C. water shows no detectable shape change. The shrinking and molding treatment on the fabric changes the boardy, harsh hand of the original fabric to a soft fabric with a pleasing dry hand. The fabric of the brassieres is softer and bulkier than those of Example 3.

Example 5

The filament yarn of Example 2 is crimped by a gear wheel at 60° and cut to staple length. This staple (65 parts) is blended with combed cotton (35 parts) and a madras fabric with 100 ends by 70 picks per inch is prepared. Temperatures in weaving and finishing are kept below 65° C. The fabric is shrunk (15% in the warp direction) with trichloroethane, molded as in Example 2, and dried on the mold. The fabric on the mold is then treated for 3 minutes at 20° C. with an 18% aqueous solution of sodium hydroxide, rinsed with cold water to remove the caustic. The fabric on the mold is then heat set to 200° C. Smooth molded shapes are obtained. It is believed that the spun yarn construction offers some degree of elongation over that obtained by restretching the shrunken fibers.

It will be apparent that many widely different embodiments of this invention may be made without departing from the spirit and scope thereof, and therefore it is not intended to be limited except as indicated in the appended claims.

I claim:

1. The process of preparing molded textile materials which comprises immersing a structure composed of low crystalline polyester fibers in a swelling agent at a temperature of 40° to 113° C. until the textile material shrinks at least 10%; removing the textile material from the swelling agent as soon as the shrinkage has occurred and drying the shrunken textile material at a temperature below 65° C.; molding the shrunken and dried textile material while still incompletely crystalline by conforming it to the shape of a mold and thereafter heating the material in the mold to set the textile material.

2. The process of claim 1 in which the swelling agent is 1,1,2-trichloroethane.

3. The process of claim 1 in which the textile material shrinks from 10% to 44%.

4. The process of claim 1 in which the polyester has a tenacity of at least 3 grams per denier, an elongation of at least 5% and an initial modulus of from about 50 to 130.

5. The process of claim 1 in which the swelling agent is trichloroethane and it is in contact with the textile material at a temperature of between 40° C. and its boiling point for a period of time between about 0.01 to 10 seconds.

6. The process of claim 1 in which the textile material is dried substantially free of the swelling agent at room temperature.

7. The process of claim 1 in which the temperature of the mold is below 100° C.

8. The process of claim 1 in which the textile material is in the form of a fabric.

9. The process of claim 8 in which the fabric is in the form of a brassiere.

10. The process of claim 8 in which the fabric is made up at least 50% of a synthetic linear condensation polyester of bifunctional ester-forming compounds, wherein at least 75% of the repeating structural units of the polymer chain include at least one divalent carbocyclic ring containing at least six carbon atoms present as an integral part of the polymer chain and having a minimum of four carbon atoms between the points of attachment of the ring in the polymer chain.

References Cited by the Examiner

UNITED STATES PATENTS

| | | | |
|---|---|---|---|
| 2,285,967 | 6/1942 | Hardy | 8—130.1 |
| 2,743,250 | 4/1956 | Sweet. | |
| 2,962,025 | 11/1960 | Bertrand | 8—130.1 |
| 2,981,978 | 5/1961 | Griffing. | |

FOREIGN PATENTS

| | | |
|---|---|---|
| 1,172,936 | 10/1958 | France. |
| 1,044,756 | 11/1958 | Germany. |
| 609,943 | 10/1948 | Great Britain. |
| 748,964 | 5/1956 | Great Britain. |
| 756,715 | 9/1956 | Great Britain. |
| 808,967 | 2/1959 | Great Britain. |

OTHER REFERENCES

Haden: Journal of the Textile Institute, vol. 53, No. 12, pp. 820–830, 1962.

NORMAN G. TORCHIN, *Primary Examiner.*